UNITED STATES PATENT OFFICE.

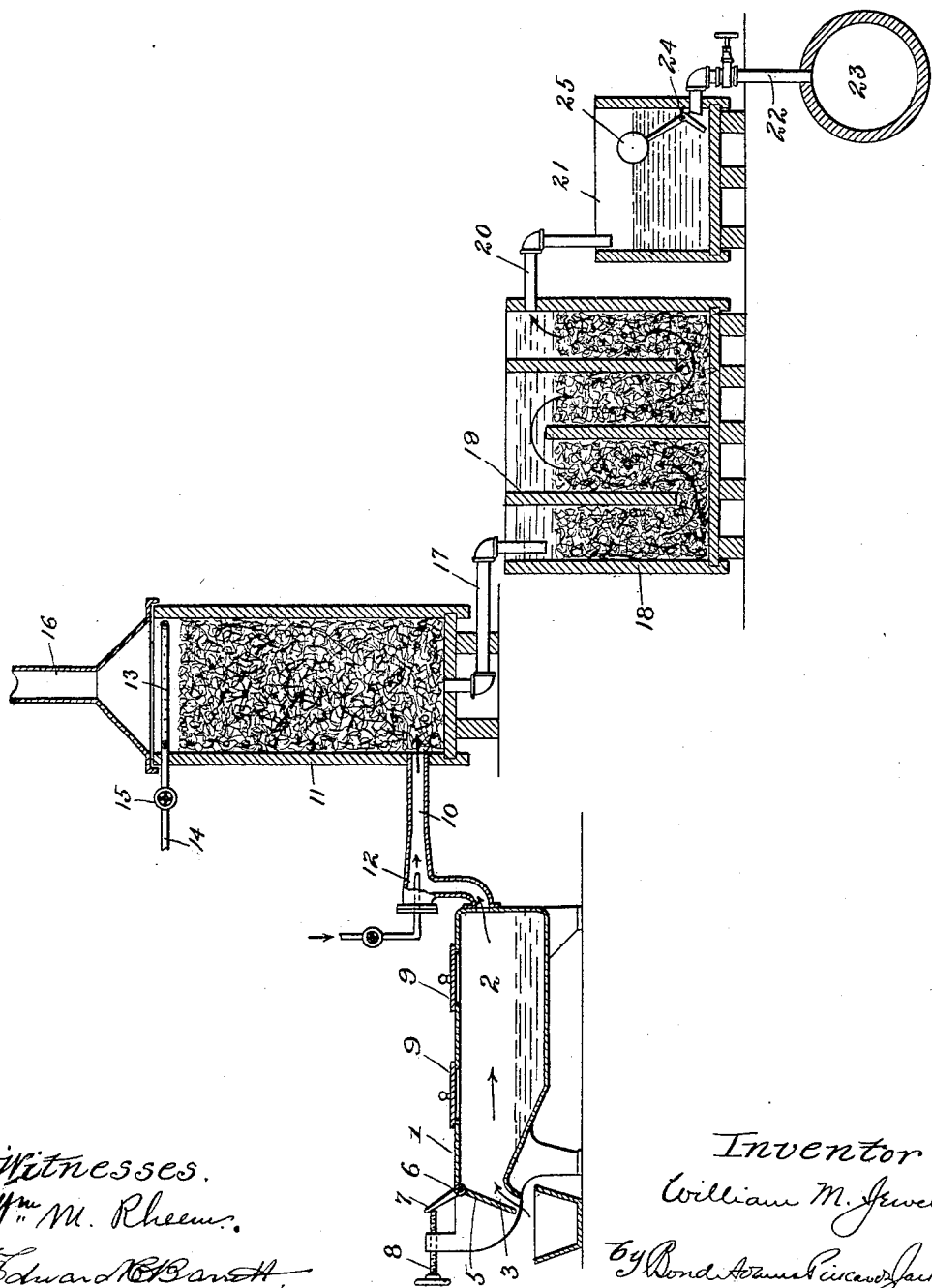

WILLIAM M. JEWELL, OF CHICAGO, ILLINOIS.

APPARATUS FOR PURIFYING WATER.

SPECIFICATION forming part of Letters Patent No. 653,742, dated July 17, 1900.

Application filed December 19, 1898. Serial No. 699,682. (No model.)

*To all whom it may concern:*

Be it known that I, WILLIAM M. JEWELL, a citizen of the United States, residing at Chicago, in the county of Cook and State of Illinois, have invented a certain new and Improved Apparatus for Purifying Water, of which the following is a specification, reference being had to the accompanying drawings.

This invention relates to an improved apparatus for the coagulation of suspended substances and impurities in waters, sewage, or other liquids for the purpose of causing such substances to coalesce or agglomerate, so that they may readily be intercepted by and retained in the bed of a filter or may otherwise be readily separated and removed from the liquid in which they were originally carried.

My improved apparatus provides for producing an anhydrid—best accomplished by the oxidation of sulfur or sulfurous substances, producing sulfurous-oxid gas—the gas produced being then dissolved in water, forming when sulfurous oxid is used sulfurous acid, the acid being passed through or in contact with any suitable metal or metallic compound soluble in or decomposed by it. Metallic iron, bauxite, or any suitable compound of iron or aluminium soluble in or decomposed by sulfurous acid are best employed with such acid, the iron or aluminium being thereby dissolved and where an iron compound is used ferrous bisulfite being produced. The solution of ferrous-bisulfite or equivalent salt is then conducted into the water or other liquid to be purified, where it is decomposed and a flocculent adhesive precipitate of ferric or of ferrous hydrate produced, the latter of which in the presence of oxidizing agents is rapidly converted into ferric hydrate. Both the ferrous and ferric hydrates are suitable for coagulating the impurities in water, and when mixed with the water act to agglomerate the suspended impurities, so that they are more readily retained by the filter-bed when the water is passed through a filter or may be otherwise separated from the water.

In the drawing I have shown a form of apparatus designed more especially for the production and utilization of sulfurous-oxid gas; but it should be understood that my invention is not limited to use only in producing said gas, as it may be employed for any other purpose for which it is adapted and of the specific form shown and hereinafter described, and it may be varied considerably without departing from my invention, which is more particularly pointed out in the claims.

Referring to the drawing, which is a longitudinal sectional view of the principal parts of the apparatus, 1 indicates a retort or vessel which is adapted to contain the sulfur or other material used to produce the sulfurous-oxid gas. The retort 1 is provided with a combustion-chamber 2, which to secure the best results is elongated, as shown in the drawing. The combustion-chamber 2 is supplied with air through a port 3 at or near one end thereof. Between the port 3 and the combustion-chamber is a bridge-wall 4, which prevents the escape of the molten sulfur.

5 indicates a door for the port 3, said door being hinged at 6 and being provided with an arm 7, which projects at an angle to the door and rests against the end of an adjusting-screw 8, so that the position of the door may be adjusted as desired for the purpose of regulating the quantity of air admitted through the port 3. By arranging the port 3 near the level of the molten sulfur, as shown, the removal of the scum or lava is facilitated.

9 indicates covers for holes provided in the top of the retort for supplying sulfur or cleaning the retort.

10 indicates a pipe which communicates with the combustion-chamber at or near the end opposite the port 3 and serves to convey the gas generated therein to a tank 11, filled with scrap-iron or other substance to be acted upon. The gas generated in the combustion-chamber 3 is drawn therefrom through pipe 10 by suction created by a steam-jet 12, which projects into pipe 10 and discharges thereinto in the direction of the tank 11. By this means not only is a suction created which supplies oxygen to the retort and carries the sulfurous oxid through pipe 10, but also the steam is thoroughly intermixed with the sulfurous oxid while both are at a high temperature, thereby promoting the formation of sulfurous acid. Upon reaching the tank 11 the sulfurous acid is condensed and hydrous sulfurous acid formed by water sprayed into said tank through a perforated ring 13 or other suitable device connected to a water-pipe 14, having a regulating-valve 15, and any gas remaining undissolved by the steam is subjected to the action of the water introduced through the ring, so that usually all passes into solution. Any excess of gas, however, may escape through a vent-pipe 16. The iron or other material in the tank 11 is acted upon by the more or less hot gas and passes into solution, ferrous bisulfite being produced when iron is used. From the tank 11 the freshly-formed bisulfite, with the excess of sulfurous acid, is discharged through a pipe 17 into a dissolving-tank 18, adapted to contain iron, (or other substance to be treated,) also preferably in the form of scrap, such as punchings, shearings, borings, &c. The pipe 17 terminates below the normal level of the solution in the tank 18, thereby forming a seal which prevents free sulfurous oxid from entering said tank through said pipe. The acid solution is caused to flow through the tank 18, passing out at the end opposite that at which it enters, and in order to obtain the longest possible contact of the acid and iron division-plates or partitions 19 are provided, which are placed in the tank 18 and are secured alternately at the top and bottom thereof, every other one of the partitions terminating near the bottom of the tank and the intermediate partitions terminating below the top thereof, all the partitions being secured at their ends to the sides of the tank, so that the acid solution is compelled to travel up and down and lengthwise of the tank, as indicated by the arrows in the drawing, finally reaching an outlet-pipe 20 at the end of the tank 18, opposite that at which it entered. By thus causing the sulfurous acid to flow over scrap-iron ferrous bisulfite is formed in solution in the dissolving-tank 18, also such solution, together with that produced in tank 11, being discharged through the pipe 20. The latter pipe discharges into a reservoir or tank 21, and the latter communicates by a pipe 22 with a main suction-pipe, which conveys the water or other liquid to be purified. A valve 24, controlled by a float 25 in the tank 21, is provided to close the pipe 22 when the tank 21 is empty, thereby preventing air from entering the water-main 23. This valve, however, may be dispensed with where there is no objection to air entering the main 23—as, for example, where said main is under pressure.

Where the main 23 is under heavy pressure and cannot be supplied conveniently with the iron solution by gravity, a force-pump may be used, which may be connected to the pipe 22, the discharge being into the main 23, or an elevated tank or reservoir may be used.

The operation of the apparatus has already been described generally; but it may be added that a charge of sulfur is placed in the retort 1 and the tanks 11 and 18 are filled with scrap-iron, after which the sulfur is ignited and the cover-plate 9 replaced. The steam-jet is then started, carrying the fumes through pipe 10 to the tank 11, hydrous sulfurous acid being produced in pipe 10 and in the condensing-tank. The sulfurous acid formed attacks the iron in the tank 11 and the solution formed with the excess of acid passes through the pipe 17 into tank 18, where it flows over and through the iron scrap therein, producing a ferrous-bisulfite solution there also. The solution after its production is discharged through the pipe 20 into the reservoir or tank 21 and thence passes to the water-main 23, where the chemical action already described takes place, resulting in the formation of a hydrate of iron, which acts to coagulate the impurities contained in the water. The water may then be filtered through a granular filter or may first be partially purified by being permitted to stand in a settling-basin, or the coagulated impurities may be removed by other suitable means.

Instead of using a water-main 23 the water to be treated may be contained in any other suitable conduit or reservoir.

It will of course be understood that when some other reagent equivalent to the iron-salt solution is to be made the appropriate metal or compound thereof is placed in the tank 18.

From the foregoing description it will be noted that a continuously-operating apparatus is provided for the production of the coagulating reagent and its introduction into the water to be purified. This continuous operation is of especial importance, as by it the coagulating reagent is introduced into the water while perfectly fresh, thereby utilizing it when most efficient. A further advantage is that the supply of the coagulating reagent may be more accurately regulated.

The method herein described of purifying water is not claimed, since it forms the subject-matter of my application for patent filed November 7, 1898, Serial No. 695,709.

That which I claim as my invention, and desire to secure by Letters Patent, is—

1. In an apparatus for purifying water, the combination of a gas-generator, a tank adapted to contain iron, means for introducing water into said iron-holding tank, means for conducting the gas generated into said tank, and means for conducting the metal-salt solution formed in said iron-holding tank to the water to be purified, substantially as described.

2. The combination of a sulfurous-oxid generator, a tank adapted to contain iron, a pipe adapted to conduct water to said iron-holding tank, means for conducting sulfurous oxid to the water which flows through said tank, a water-main, and means for conducting the solution from said iron-holding tank to said water-main, substantially as described.

3. The combination of a sulfurous-oxid generator, a tank adapted to contain iron, a pipe adapted to conduct water to said iron-holding tank, means for conducting sulfurous oxid to the water which flows through said tank, an outlet-pipe for said iron-holding tank, a receiving-tank adapted to receive the metal-salt solution from said outlet-pipe, a water-main, and means for conducting the reagent from said receiving-tank to said main, substantially as described.

4. In an apparatus for purifying water, the combination of a gas-generator, an iron-holding tank, means for supplying water to said tank, means for conducting gas from said generator into the water which is supplied to said tank, means for containing the water to be purified and means for conducting the liquid from said iron-holding tank to the water to be purified, substantially as described.

5. In an apparatus for purifying water, the combination of a sulfurous-oxid generator, an iron-holding tank, means for supplying water to said tank, means for conducting sulfurous oxid from said generator into the water which is supplied to said tank, a conduit for containing the water to be purified, and means for conducting the liquid from said iron-holding tank to the water to be purified, substantially as described.

6. In an apparatus for purifying water, the combination of a sulfurous-oxid generator, a tank adapted to contain iron, means for introducing water into said metal-holding tank, means for conducting the sulfurous oxid to said tank, and means for conducting the metal-salt solution formed in said metal-holding tank to the water to be purified, substantially as described.

7. The combination with a sulfurous-oxid generator, and a tank adapted to contain iron, of a pipe adapted to conduct water to said metal-holding tank, means for conducting sulfurous oxid to the water which flows through said tank, an outlet-pipe from said metal-holding tank, a receiving-tank adapted to receive the metal-salt solution from said outlet-pipe, a water-main, a pipe adapted to conduct the metal-salt solution from said receiving-tank to said water-main, and a float-valve in said receiving-tank, substantially as described.

WILLIAM M. JEWELL.

Witnesses:
OMAR H. JEWELL,
JOHN L. JACKSON.